(12) United States Patent
Lode

(10) Patent No.: US 8,127,606 B2
(45) Date of Patent: Mar. 6, 2012

(54) FAULT TOLERANT MULTIDIMENSIONAL ACCELERATION AND/OR ROTATION SENSOR ARRAYS WITH MINIMUM NUMBERS OF REDUNDANT SINGLE DIMENSION SENSORS AND ASSOCIATED SIGNAL COMPUTATION MEANS

(76) Inventor: Tenny Dahlin Lode, Boulder, CO (US)

( * ) Notice: Subject to any disclaimer, the term of this patent is extended or adjusted under 35 U.S.C. 154(b) by 414 days.

(21) Appl. No.: 12/319,589

(22) Filed: Jan. 8, 2009

(65) Prior Publication Data
US 2009/0178481 A1 Jul. 16, 2009

Related U.S. Application Data

(60) Provisional application No. 61/010,767, filed on Jan. 11, 2008.

(51) Int. Cl.
*G01C 19/00* (2006.01)
(52) U.S. Cl. .................. 73/504.03; 73/510; 73/1.37
(58) Field of Classification Search ............... 73/504.03, 73/503, 504.04, 504.12, 507, 510, 514.01, 73/514.02, 514.16, 1.37; 342/357.62
See application file for complete search history.

(56) References Cited

U.S. PATENT DOCUMENTS

| | | | | |
|---|---|---|---|---|
| 2,936,627 | A * | 5/1960 | Wing et al. | 74/5.34 |
| 3,258,974 | A * | 7/1966 | Diamond | 73/514.09 |
| 3,509,971 | A * | 5/1970 | Gerstine et al. | 188/382 |
| 5,297,052 | A * | 3/1994 | McIntyre et al. | 701/220 |
| 5,406,502 | A * | 4/1995 | Haramaty et al. | 702/183 |
| 6,691,066 | B1 * | 2/2004 | Brodie | 702/185 |
| 7,805,245 | B2 * | 9/2010 | Bacon et al. | 701/220 |
| 2002/0008661 | A1 * | 1/2002 | McCall et al. | 342/357.14 |
| 2002/0193920 | A1 * | 12/2002 | Miller et al. | 701/29 |
| 2004/0199833 | A1 * | 10/2004 | Brodie | 714/48 |
| 2005/0060093 | A1 * | 3/2005 | Ford et al. | 701/214 |
| 2005/0090947 | A1 * | 4/2005 | Wise | 701/6 |
| 2005/0114023 | A1 * | 5/2005 | Williamson et al. | 701/214 |
| 2006/0074558 | A1 * | 4/2006 | Williamson et al. | 701/213 |

* cited by examiner

*Primary Examiner* — Hezron E Williams
*Assistant Examiner* — Samir M Shah
(74) *Attorney, Agent, or Firm* — A Law Firm, PC, Aileen Law

(57) ABSTRACT

An inertial system design approach that can sense and tolerate failures of individual single dimensional acceleration and/or rotation sensors with a minimal number of sensors. Sets of 4 single dimensional acceleration and/or rotation sensors can provide full 3 dimensional sensing in spite of a sensor malfunction or failure, and sets of 3 single dimensional acceleration and/or rotation sensors can provide full 2 dimensional sensing in spite of a sensor malfunction or failure.

9 Claims, 1 Drawing Sheet

FAULT TOLERANT MULTIDIMENSIONAL ACCELERATION AND/OR ROTATION SENSOR ARRAYS WITH MINIMUM NUMBERS OF REDUNDANT SINGLE DIMENSION SENSORS AND ASSOCIATED SIGNAL COMPUTATION MEANS

STATEMENT REGARDING FEDERALLY SPONSORED RESEARCH OR DEVELOPMENT

None.

BACKGROUND OF THE INVENTION

1. Field of the Invention

This invention relates to the accurate measurement of the multidimensional acceleration and/or rotation of a sensor structure in spite of possible errors in measurement by an individual acceleration sensor and/or individual rotation sensor. Applications include inertial navigation and guidance systems.

2. Description of Related Prior Art

U.S. Pat. No. 5,363,700, Nov. 15, 1994, Skewed Axis Inertial Sensor Assembly. This patent shows a 3 dimensional, failure tolerant, 6 accelerometer, and/or 6 rotation sensor system. It is representative of the known prior art. It can tolerate one accelerometer failure, and/or one gyro failure.

The use of arrays of 6 accelerometers and/or 6 rotation sensors in a 3 dimensional sensor array would require 50% more sensors than the 4 accelerometers and/or rotation sensors that would be required with the current invention. In addition to the size, weight and cost penalties of using arrays of 6 sensors rather than 4, the probable time to a sensor failure will be shorter with arrays of 6 rather than 4 sensors simply because there are more sensors to fail.

BRIEF SUMMARY OF THE INVENTION

The subject invention relates to fault tolerant multidimensional (2 or 3 dimensions) acceleration and/or rotation sensing with redundant arrays of single dimension sensors. Possible applications include inertial guidance systems for aircraft and space vehicles and/or the measurement of vehicle motion.

The required number of single dimension acceleration and/or rotation sensors in an array is one more than the number of array dimensions. That is, arrays of 3 (or 4) single dimension sensors will be sufficient for sensing in 2 (or 3) dimensions. These numbers of single dimension sensors are lower than the numbers required in other known fault tolerant sensor arrays.

A fault in one sensor in a group can be detected, and the multidimensional data derived from data from the remaining sensors. Faults in 2 or more sensors in a group can be detected, but the acceleration or rotation data can not then be derived.

Such arrays can be used with stabilized sensor platforms or in strapped down arrangements.

BRIEF DESCRIPTION OF THE DRAWING

The drawing illustrates the various acceleration sensing and computed axes referred to in a description of a first form of the invention.

DETAILED DESCRIPTION OF THE INVENTION

Figure 1:
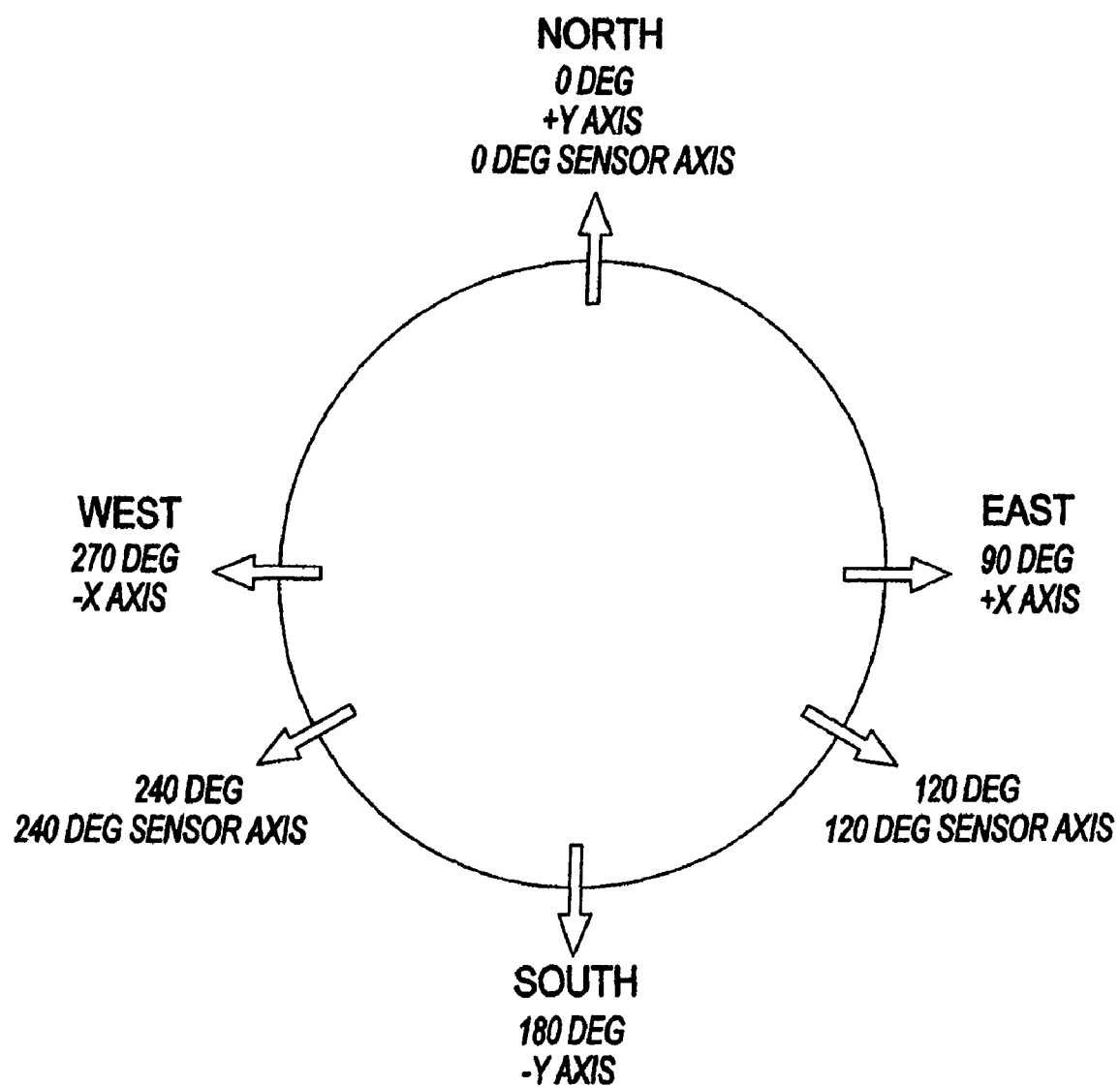

This description is in 2 parts. The first part is a general view of the process of detecting and identifying individual sensor measurement errors. The second part is a more detailed description of the functioning of 4 specific sensor arrangements.

Assume that we have a simple 2 dimensional acceleration measuring system with 3 single dimensional accelerometers on a horizontal mounting plate. The accelerometers are arranged such that their sensing directions are not parallel, or even very close to parallel. The signal outputs of the 3 accelerometers can be considered as 3 single, one dimensional vectors in a 2 dimensional horizontal space. These vectors will point in 3 different directions. With a little bit of vector mathematics, we can come up with a formula whereby the vector sum of the 3 outputs will be zero regardless of the value or direction of the sensed acceleration provided the accelerometers are functioning properly.

If there is a failure of one accelerometer, so that its output signal is no longer correct, the vector sum of the 3 accelerometer signals will no longer be zero but will be a vector value parallel to the output of the failed sensor. This will be an indication that there is a sensor failure, that it is a failure of only one sensor, and which one it is. A failure of 2 or all 3 sensors, with erroneous outputs, will result in a vector sum that is non zero and not parallel with the sensing axis of any one sensor.

For 4 sensors in a 3 dimensional array, the system operation can be quite similar. Derive a formula for a 3 dimensional sum of the 4 sensor outputs which will normally be zero. With a single sensor failure, the sum will be a vector parallel to the failed sensor. With a failure of more than one sensor, the vector sum will generally not be parallel to any individual sensor axis.

For the second part of this section, the following descriptions are of 3 forms of the invention and some comments on rotation sensing and strapped down sensor arrays.

1: A first form of the invention, illustrated in the drawing. A 2 dimensional fault tolerant array of 3 single dimensional acceleration sensors on a rotation stabilized platform. The sensing axes are equally spaced at 0, 120 and 240 degrees relative to the Y axis, as shown in the FIGURE. This is intended as an introductory description of the general concepts of the invention. The FIGURE illustrates the arrangement of the 0, 120 and 240 degree sensing axes and the X and Y calculation axes.

2: A second form of the invention, a 2 dimensional fault tolerant array of 3 single dimensional acceleration sensors on a rotation stabilized platform with the sensing axes at 0, 45 and 90 degrees relative to the Y axis. This is intended to show an alternate sensor arrangement which does not have uniform angular spacing.

3: A third form of the invention, a 3 dimensional fault tolerant array of 4 single dimensional acceleration sensors on a rotation stabilized platform. This is intended as a description of the concepts and operation of a 3 dimensional system.

4: Comments on fault tolerant rotation sensor arrays and on strapped down fault tolerant sensor arrays. These are intended to outline some additional forms of the invention.

1: A 2 dimensional fault tolerant array of 3 single dimensional acceleration sensors on a rotation stabilized platform. The sensing axes are equally spaced at 0, 120 and 240 degrees relative to the Y axis, as shown in the FIGURE. This is intended as an introductory description of the general concepts of the invention. A FIGURE illustrating the arrangement of the 0, 120 and 240 degree sensing axes and the X and Y calculation axes is included.

Two dimensional acceleration sensing and a rotation stabilized platform were chosen for the first example as they can be easier to visualize than 3 dimensional sensing, rotation sensing or strapped down sensor arrays. Also, with a rotation stabilized platform, there will be no complications due to centrifugal forces.

In describing and analyzing accelerations and rotations at specific locations on specific structures, it should be noted that they are single vector values along single directions. For example, an acceleration will be a single value along a single direction in a 2 dimensional or 3 dimensional space. It may be convenient to describe it as components of acceleration along 2 or more directions. However, at any single instant, it is a single acceleration along a single direction. Similarly, a rotation, at any single instant, is a single rotation about a single axis.

In the example shown in the FIGURE, 3 single dimension sensors are arranged to measure accelerations along 3 axes corresponding to the positions of the vertices of an equilateral triangle relative to its center. The 3 sensed acceleration values are Sns000, Sns120 and Sns240. Positive acceleration values indicate accelerations away from the center of the array. A result of this arrangement is that the vector sum of the 3 acceleration vectors should be zero. The FIGURE is intended to illustrate the sensing axes of the 3 accelerometers, not necessarily their physical positions. AccX and AccY are the X and Y acceleration values that are to be calculated from the Sns000, Sns120 and Sns240 values.

Sensed acceleration values and their axes:
Sns000, 000 deg, forward.
Sns120, 120 deg, to the right and the rear.
Sns240, 240 deg, to the left and the rear.
Also see the FIGURE.
X and Y axes acceleration values to be calculated from sensed acceleration values:
AccX, 90 deg, to the right.
AccY, 0 deg, forward.
Also see the FIGURE.

All of the acceleration values, AccX, AccY, Sns000, Sns120 and Sns240, can be considered as 1 dimensional components of physical accelerations. All are measured outward, away from the center of the measurement triangle. The acceleration sensors, for Sns000, Sns120 and Sns240, are single dimension sensors. The calculated AccX and AccY acceleration component values are independent. That is, if we had both AccX and AccY single dimension acceleration sensors, an acceleration component sensed by one would be independent of the value sensed by the other. The sensed Sns000, Sns120 and Sns240 values are not independent. An acceleration along the Sns axis will be sensed by all 3 of the Sns000, Sns120 and Sns240 sensors, though not to the same extent. This interdependence of measured values makes it possible to detect accelerometer faults, and to measure 2 dimensional accelerations with any 2 of the 3 sensor signals.

The object here is to determine the accelerations as values in the X and Y axes even though one of the sensors may be faulty. There are 2 parts to this process. One is the selection of the apparent best 2 out of the 3 acceleration measurements. The second is the calculation of the acceleration values along the X and Y axes using data from the 2 selected sensors. The selection of the best 2 out of 3 sensors can increase the probable system accuracy even when there are no substantial sensor errors.

Expressing the single dimension Sns000, Sns120 and Sns240 sensed acceleration values as functions of the AccX and AccY accelerations:

Sensed values, if correctly sensed (no sensor failures):

$$Sns000 = AccY$$

$$Sns120 = \cos(120\,deg)*AccY + \sin(120\,deg)*AccX$$

$$= -.5*AccY + sqrt(.75)*AccX$$

$$Sns240 = \cos(240\,deg)*AccY + \sin(240\,deg)*AccX$$

$$= -.5*AccY - sqrt(.75)*AccX$$

The cos of 120 deg, and of 240 deg, are −0.5.
The sin of 120 deg is +sqrt(0.75)=+0.86602540 to 8 digits.
The sin of 240 deg is −sqrt(0.75)=−0.86602540 to 8 digits.
The above sin and cos values are calculated on the basis of sin(30 deg)=0.5 and the Pythagorean relationship of sin(x)^2+cos(x)^2=1.

Adding the above 3 equations together:

Sns000+Sns120+Sns240=AccY−0.5*AccY+sqrt(0.75)*AccX−0.5*AccY−sqrt(0.75)*AccX=0

That is, if all 3 accelerometers are operating properly, the 2 dimensional vector sum of the 3 individual accelerometer signals will be zero in theory, and very near zero in reality, regardless of what the individual AccX and AccY values may be.

The summing of the 3 measured values may be visualized as representing the total outflow of acceleration, which should be zero in the absence of centrifugal forces. This gives us a way to determine if all 3 sensors are operating properly, if one sensor is bad, or if 2 or more sensors are bad.

A bad measurement by one accelerometer will generally result in the 2 dimensional vector sum being non zero along the sensing axis of the bad accelerometer. Bad measurements by two or three accelerometers will generally result in the 2 dimensional vector sum being non zero, but not aligned with any one sensing axis. However, these error indications may not be continuous. It is a bit like the fact that a stopped clock will be correct twice a day (for a clock with a 12 hour display).

To summarize one possible form of the error detection and accommodation process:

If the 3 sensor vector sum is small, within a reasonable tolerance, and not predominantly along one of the sensor directions, it may be desirable to calculate the AccX and AccY values from each of the 3 pairs of sensed accelerations and use the averages of the 3 AccX and AccY values.

If the 3 sensor vector sum is predominantly along the axis of one sensor, ignore the data from that sensor and calculate the AccX and AccY values from the 2 remaining sensors. If the single axis vector sum is greater than an acceptable value, assume that one sensor has failed and do not use data from that sensor thereafter.

If the 3 sensor vector sum is greater than an acceptable value along more than one sensing axis, assume that 2 or more sensors have failed and that the system has failed.

The calculation of AccX and AccY from selected pairs of the 3 accelerometer signals:

As shown previously, Sns000=AccY

Sns120=−0.5*AccY+sqrt(0.75)*AccX

Sns240=−0.5*AccY−sqrt(0.75)*AccX

The calculation of AccX and AccY from only Sns000 and Sns120, not using Sns240:

The easy part: Sns000=AccY

Thus: AccY=Sns000

The other part: Sns120=−0.5*AccY+sqrt(0.75)*AccX

Sns120=−0.5*Sns000+sqrt(0.75)*AccX

Sns120+0.5*Sns000=sqrt(0.75)*AccX

Thus: AccX=(Sns120+0.5*Sns000)/sqrt(0.75)

Summary: AccX=(0.5*Sns000+Sns120)/sqrt(0.75)

AccY=Sns000

The calculation of AccX and AccY from only Sns000 and Sns240, not using Sns120:

The easy part: Sns000=AccY

Thus: AccY=Sns000

The other part: Sns240=−0.5*AccY−sqrt(0.75)*AccX

Sns240=−0.5*Sns000−sqrt(0.75)*AccX

Sns240+0.5*Sns000=−sqrt(0.75)*AccX

Thus AccX=(−Sns240+0.5*Sns000)/sqrt(0.75)

Summary AccX=(0.5*Sns000−Sns240)/sqrt(0.75)

AccY=Sns000

The calculation of AccX and AccY from only Sns120 and Sns240, not using Sns000:

We know: Sns120=−0.5*AccY+sqrt(0.75)*AccX

Sns240=−0.5*AccY−sqrt(0.75)*AccX

The sum of the above 2 eq: Sns120+Sns240=−AccY

The difference of the above 2 eq: Sns120−Sns240=2*sqrt(0.75)*AccX

Thus: AccX=(Sns120−Sns240)/(2*sqrt(0.75))

AccY=−(Sns120+Sns240)

In an actual sensor array, the effective sensor geometry and/or sensor sensitivities may not be exactly as assumed above. An actual array can be calibrated by measuring the acceleration sums in response to actual accelerations and appropriately adjusting the computation parameters for the processing of the sensor signals.

2: A 2 dimensional fault tolerant array of 3 single dimensional acceleration sensors on a rotation stabilized platform with the sensing axes at 0, 45 and 90 degrees relative to the Y axis. This is intended to show an alternate sensor arrangement which does not have uniform angular spacing.

In this example, the 3 sensors are arranged to sense accelerations along the 0, 45 and 90 degree lines relative to the Y axis.

Sensed acceleration values and their axes:
Sns00 00 deg, forward.
Sns45 45 deg, to the right and forward.
Sns90 90 deg, to the right.
Also see the FIGURE.
The to be calculated acceleration values along the X and Y axes are:
AccX 90 deg, to the right.
AccY 0 deg, forward.
Also see the FIGURE.

Sensed values, if correctly sensed (no sensor failures):

$$Sns00 = AccY$$

$$Sns45 = \cos(45\,deg) * AccX + \cos(45\,deg) * AccY$$
$$= \cos(45\,deg) * (AccX + AccY)$$

$$Sns90 = AccX$$

The cos of $45\,deg$ is $+sqrt(.5) = +.70710678$ to 8 digits.

Combining the above 3 equations, with an adjustment to Sns45:

Sns00−Sns45/cos(45 deg)+Sns90=AccY−AccX−AccY+AccX=0

Thus, as with the previous example of section 1, we have a vector sum that will be zero if all 3 sensed values are correct, an indication of a single sensor error if a significant vector sum is parallel to an individual sensor value, and an indication of a multiple sensor error if a significant vector sum is not parallel to an individual sensor value.

The calculation of AccX and AccY from selected pairs of the 3 accelerometer signals:

The calculation of AccX and AccY from only Sns00 and Sns90, not using Sns45:

AccX and AccY are simply equal to Sns00 and Sns90. No calculation needed.

AccX=Sns90

AccY=Sns00

The calculation of AccX and AccY from only Sns00 and Sns45, not using Sns90:

The easy part: AccY=Sns00

The other part: Sns45=cos(45 deg)*(AccX+AccY)

Sns45/cos(45 deg)=AccX+AccY

Thus: AccX=Sns45/cos(45 deg)−Sns00

Summary: AccX=Sns45/cos(45 deg)−Sns00

AccY=Sns00

The calculation of AccX and AccY from only Sns45 and Sns90, not using Sns00:

The easy part: AccX=Sns90

The other part: Sns45=cos(45 deg)*(AccX+AccY)

Sns45/cos(45 deg)=AccX+AccY

Thus: AccY=Sns45/cos(45 deg)−Sns90

Summary: AccX=Sns90

AccY=Sns45/cos(45 deg)−Sns90

Thus, a uniform spacing of sensor axes is not required. However, something approximating uniform spacing will probably give better performance.

3: A 3 dimensional fault tolerant array of 4 single dimensional acceleration sensors on a rotation stabilized platform. This is intended as a description of the concepts and operation of a 3 dimensional system.

This form of the invention is similar to the 2 dimensional first form except for the extension to 3 dimensions. The first form had 3 single dimension sensors arranged to measure accelerations along 3 axes corresponding to the positions of the vertices of an equilateral triangle relative to its center. This 3 dimensional third form has 4 single dimension sensors arranged to measure accelerations along 4 axes corresponding to the positions of the vertices of an equilateral tetrahedron relative to its center.

Sensed acceleration values and axes:
SnsZ00 horizontal, 0 deg, forward, and ⅓ down.
SnsZ12 horizontal, 120 deg, to the right and rear, and ⅓ down.
SnsZ24 horizontal, 240 deg, to the left and rear, and ⅓ down.
SnsZZZ vertical, upward.

To be calculated acceleration values and axes:
AccX horizontal, 90 deg, to the right.
AccY horizontal, 0 deg, forward.
AccZ vertical, upward.

The 2 perpendicular axes of the 2 previous 2 dimensional forms were X and Y, with X being right-left and Y being forward-backward. For this example, a 3rd perpendicular axis Z is added, with Z being up-down. Hence, we have AccX (right-left), Accy (forward-backward) and AccZ (up-down) as the 3 acceleration values that we want to obtain. The 4 sensed values, SnsZ00, SnsZ12, SnsZ24 and SnsZZZ are similar to the 3 sensor arrays of the 2 dimensional systems with the addition of a vertical sensor and the tilting of the 3 horizontal sensors of the first system downward to complete the vertical sensing capability.

Sensed values, if correctly sensed (no sensor failures):

$$SnsZZZ = AccZ$$
$$SnsZ00 = -(AccZ/3) + sqrt(8/9)*AccY$$
$$SnsZ12 = -(AccZ/3) + sqrt(8/9)*(\cos(120\,deg)*AccY + \sin(120\,deg)*AccX)$$
$$= -(AccZ/3) + sqrt(8/9)*(-.5*AccY + sqrt(.75)*AccX)$$
$$SnsZ24 = -(AccZ/3) + sqrt(8/9)*(\cos(240deg)*AccY + \sin(240\,deg)*AccX)$$
$$= -(AccZ/3) + sqrt(8/9)*(-.5*AccY - sqrt(.75)*AccX)$$

Adding the above 4 equations together:

$$SnsZZZ + SnsZ00 + SnsZ12 + SnsZ24 =$$
$$AccZ - 3*AccZ/3 + sqrt(8/9)*AccY +$$
$$sqrt(8/9)*(-.5*AccY + sqrt(.75)*AccX) +$$
$$sqrt(8/9)*(-.5*AccY - sqrt(.75)*AccX) = 0$$

If all 4 accelerometers are operating properly, the 3 dimensional vector sum of the 4 individual accelerometer signals will be zero in theory and very near zero in reality regardless of what the individual AccX, AccY and AccZ values may be. Again, the sum of the 4 accelerometer signals may be visualized as representing the total outflow of acceleration which should be zero in the absence of centrifugal forces. The vector sum will be zero if all 4 sensed values are correct, an indication of a single sensor error if a significant vector sum is generally parallel to an individual sensor axis, and an indication of a multiple sensor error if a significant vector sum is not parallel to an individual sensor value.

The calculation of AccX, AccY and AccZ from selected trios of the 4 accelerometer signals:

As shown previously: $SnsZZZ = AccZ$ $$SnsZ00 = -(AccZ/3) + sqrt(8/9)*AccY$$
$$SnsZ12 = -(AccZ/3) + sqrt(8/9)*(-.5*AccY + sqrt(.75)*AccX)$$
$$SnsZ24 = -(AccZ/3) + sqrt(8/9)*(-.5*AccY - sqrt(.75)*AccX)$$

To calculate the desired rectangular coordinates AccX, AccY and AccZ from selected trios of the 4 accelerometer signals SnsZZZ, SnsZ00, SnsZ12 and SnsZ24:

The calculation of AccX, AccY, and AccZ from only SnsZ00, SnsZ12, and SnsZ24, not using SnsZZZ:

The easy part: AccZ=−(SnsZ00+SnsZ12+SnsZ24)

For AccY, using AccZ as a known value:

SnsZ00=−(AccZ/3)+sqrt(8/9)*AccY

SnsZ00+(AccZ/3)=sqrt(8/9)*AccY

AccY=(SnsZ00+(AccZ/3))/sqrt(8/9)

For AccX, using AccZ as a known value:

$$SnsZ12 - SnsZ24 = -(AccZ/3) +$$
$$sqrt(8/9)*(-.5*AccY + sqrt(.75)*AccX) +$$
$$(AccZ/3) - sqrt(8/9)*(-.5*AccY - sqrt(.75)*AccX)$$
$$SnsZ12 - SnsZ24 = +sqrt(8/9)*(-.5*AccY + sqrt(.75)*AccX) -$$
$$sqrt(8/9)*(-.5*AccY - sqrt(.75)*AccX)$$
$$SnsZ12 - SnsZ24 = +sqrt(8/9)*(+sqrt(.75)*AccX) -$$
$$sqrt(8/9)*(-sqrt(.75)*AccX)$$
$$SnsZ12 - SnsZ24 = 2*sqrt(8/9)*(sqrt(.75)*AccX$$
$$AccX = (SnsZ12 - SnsZ24)/(2*sqrt(8/9)*sqrt(.75))$$

Summary:

AccX=(SnsZ12−SnsZ24)/(2*sqrt(8/9)*sqrt(0.75))

AccY=(SnsZ00+(AccZ/3))/sqrt(8/9)

AccZ=−(SnsZ00+SnsZ12+SnsZ24)

The calculation of AccX, AccY, and AccZ from only SnsZZZ, SnsZ12, and SnsZ24, not using SnsZ00:

The easy part: AccZ=SnsZZZ

For AccY, using AccZ as a known value:

SnsZ00=−(AccZ/3)+sqrt(8/9)*AccY

SnsZ00+(AccZ/3)=sqrt(8/9)*AccY

AccY=(SnsZ00+(AccZ/3))/sqrt(8/9)

For AccX, using AccZ as a known value:

$$SnsZ12 - SnsZ24 = -(AccZ/3) +$$
$$sqrt(8/9)*(-.5*AccY + sqrt(.75)*AccX) +$$

-continued $$(AccZ/3) - sqrt(8/9) * (-.5 * AccY - sqrt(.75) * AccX)$$

$$SnsZ12 - SnsZ24 = +sqrt(8/9) * (-.5 * AccY + sqrt(.75) * AccX) -$$
$$sqrt(8/9) * (-.5 * AccY - sqrt(.75) * AccX)$$

$$SnsZ12 - SnsZ24 = +sqrt(8/9) * (+sqrt(.75) * AccX) -$$
$$sqrt(8/9) * (-sqrt(.75) * AccX)$$

$$SnsZ12 - SnsZ24 = 2 * sqrt(8/9) * (sqrt(.75) * AccX)$$

$$AccX = (SnsZ12 - SnsZ24)/(2 * sqrt(8/9) * sqrt(.75))$$

Summary:

AccX=(SnsZ12−SnsZ24)/(2*sqrt(8/9)*sqrt(0.75))

AccY=(SnsZ00+(AccZ/3))/sqrt(8/9)

AccZ=SnsZZZ

The procedures for the calculation of AccX and Accy from SnsZ00, SnsZ12 and SnsZ24 are very similar to from SnsZZZ, SnsZ12 and SnsZ24.

The calculation of AccX, AccY, and AccZ from only SnsZZZ, SnsZ00, and SnsZ24, not using SnsZ12:

The easy part: AccZ=SnsZZZ

For AccY, using AccZ as a known value:

SnsZ00=−(AccZ/3)+sqrt(8/9)*AccY

SnsZ00+(AccZ/3)=sqrt(8/9)*AccY

AccY=(SnsZ00+(AccZ/3))/sqrt(8/9)

For AccX, using AccY and AccZ as known values:

SnsZ24=−(AccZ/3)+sqrt(8/9)*(−0.5*AccY−sqrt(0.75)*AccX)

SnsZ24+(AccZ/3)=+sqrt(8/9)*(−0.5*AccY−sqrt(0.75)*AccX)

(SnsZ24+(AccZ/3))/sqrt(8/9)=(−0.5AccY−sqrt(0.75)*AccX)

AccX=((SnsZ24+(AccZ/3))/sqrt(8/9)))/(−0.5AccY−sqrt(0.75))

Summary:

AccX=((SnsZ24+(AccZ/3))/sqrt(8/9)))/(−0.5AccY−sqrt(0.75))

AccY=(SnsZ00+(AccZ/3))/sqrt(8/9)

AccZ=SnsZZZ

The calculation of AccX, AccY, and AccZ from only SnsZZZ, SnsZ00, and SnsZ12, not using SnsZ24:

The easy part: AccZ=SnsZZZ

For AccY, using AccZ as a known value:

SnsZ00=−(AccZ/3)+sqrt(8/9)*AccY

SnsZ00+(AccZ/3)=sqrt(8/9)*AccY

AccY=(SnsZ00+(AccZ/3))/sqrt(8/9)

For AccX, using AccY and AccZ as known values:

SnsZ12=−(AccZ/3)+sqrt(8/9)*(−0.5*AccY+sqrt(0.75)*AccX)

SnsZ12+(AccZ/3)=+sqrt(8/9)*(−0.5*AccY+sqrt(0.75)*AccX)

(SnsZ12+AccZ/3))/sqrt(8/9)=(−0.5*AccY+sqrt(0.75)*AccX)

AccX=((SnsZ12+AccZ/3))/sqrt(8/9))/(−0.5*AccY+sqrt(0.75)*AccX)

Summary:

AccX=((SnsZ12+AccZ/3))/sqrt(8/9))/(−0.5*AccY+sqrt(0.75)*AccX)

AccY=(SnsZ00+(AccZ/3))/sqrt(8/9)

AccZ=SnsZZZ

4: Comments on fault tolerant rotation sensor arrays and on strapped down fault tolerant sensor arrays. These are intended to outline some additional forms of the invention.

The general concepts for fault tolerant rotation sensing can be quite similar to those for acceleration sensing. It can be convenient to represent a rotation as a "right hand" vector along the axis of rotation. That is, if a partly closed right hand is held such that the fingers point generally in the direction of the rotation, the rotation vector is perpendicular to the rotation motion and in the general direction of the thumb.

The numeric value of the vector represents the speed of the rotation. A fault tolerant multidimensional rotation sensing system can be constructed by analyzing the rotation vectors in a manner similar to the preceding analysis of acceleration vectors.

Failure tolerant strapped down sensor arrays can be designed using the same general concepts as previously described. In the case of a strapped down acceleration sensor array, it may be necessary or desirable to consider the centrifugal forces due to rotary motion of an acceleration sensor array.

The invention claimed is:

1. An inertial sensor system comprising:
a plurality of inertial measurement devices, said plurality comprising either accelerometers, rotation sensors or both;
each of said devices in said plurality capable of sensing an acceleration value or a rotation value along three different axes in substantially different directions, said acceleration or rotation values capable of being represented in vector form;
signal detection and analysis means for receiving data from each of said devices in said plurality and applying appropriate multiplication factors for one or more of said acceleration or rotation values to determine if a vector sum of one or more acceleration or rotation values has a zero or near-zero vector value; and
wherein said signal detection and analysis means correlates a significant non-zero vector value with a failure or malfunction in one or more inertial measurement devices.

2. The system of claim 1, wherein an occurrence of a significant non-zero vector value in conjunction with its being parallel with a sensing axis of an inertial measurement device identifies the inertial measurement device which has failed or malfunctioned.

3. The system of claim 1, wherein an occurrence of a significant non-zero vector value in conjunction with its not being parallel with a sensing axis of any one inertial measurement device identifies the two or more inertial measurement devices which have failed or malfunctioned.

4. An inertial sensor system comprising:
a grouping of inertial measurement devices that form a set of three accelerometers, a set of three rotation sensors or a set of three accelerometers and three rotation sensors, the devices in a grouping capable of sensing an acceleration value or rotation value along three different axes in substantially different directions, the sensed acceleration or rotation values capable of being represented in vector form;

a signal detection and analysis means for receiving said sensed acceleration or rotation values from each of said devices in a grouping and determining if a vector sum of said sensed acceleration or rotation values has a zero or near-zero vector value; and said signal detection and analysis means determining that a significant non-zero vector value indicates a malfunction in at least one of the devices in a grouping and allowing the system to continue to operate if two devices in a grouping remain functional.

5. The system of claim 4, wherein an occurrence of a significant non-zero vector value in conjunction with its being parallel with a sensing axis of an inertial measurement device identifies the inertial measurement device which has failed or malfunctioned.

6. The system of claim 4, wherein an occurrence of a significant non-zero vector value in conjunction with its not being parallel with a sensing axis of any one inertial measurement device identifies the two or more inertial measurement devices which have failed or malfunctioned.

7. An inertial sensor system comprising:
a grouped set of at least four accelerometers, a grouped set of at least four rotation sensors or a grouped set of at least four accelerometers and at least four rotation sensors, the accelerometers or rotation sensors in a grouped set capable of sensing an acceleration value or rotation value along three different axes in substantially different directions, the sensed acceleration or rotation values capable of being represented in vector form;

a signal detection and analysis means for receiving said sensed acceleration or rotation values from each of the accelerometers or rotation sensors in a grouped set and determining if a vector sum of said sensed acceleration or rotation values has a zero or near-zero vector value; and said signal detection and analysis means determining that a significant non-zero vector value indicates a malfunction in at least one of the accelerometers or rotation sensors in a grouped set and allowing the system to continue to operate if at least two accelerometers or at least two rotation sensors in a grouped set remain functional.

8. The system of claim 7, wherein an occurrence of a significant non-zero vector value in conjunction with its being parallel with a sensing axis of an accelerometer or rotation sensor in a grouped set identifies the accelerometer or rotation sensor which has failed or malfunctioned.

9. The system of claim 7, wherein an occurrence of a significant non-zero vector value in conjunction with its not being parallel with a sensing axis of any one accelerometer or rotation sensor in a grouped set identifies the two or more accelerometers or rotation sensors which have failed or malfunctioned.

* * * * *